(12) United States Patent
Pape

(10) Patent No.: US 11,958,418 B2
(45) Date of Patent: Apr. 16, 2024

(54) CAMERA ARM DEVICE FOR A MIRROR REPLACEMENT SYSTEM FOR A MOTOR VEHICLE AND MOTOR VEHICLE

(71) Applicant: Continental Automotive GmbH, Hannover (DE)

(72) Inventor: Lukas Pape, Villingen-Schwenningen (DE)

(73) Assignee: Continental Automotive GmbH, Hannover (DE)

( * ) Notice: Subject to any disclaimer, the term of this patent is extended or adjusted under 35 U.S.C. 154(b) by 249 days.

(21) Appl. No.: 17/598,171

(22) PCT Filed: Mar. 18, 2020

(86) PCT No.: PCT/EP2020/057468
§ 371 (c)(1),
(2) Date: Sep. 24, 2021

(87) PCT Pub. No.: WO2020/200790
PCT Pub. Date: Oct. 8, 2020

(65) Prior Publication Data
US 2022/0176893 A1 Jun. 9, 2022

(30) Foreign Application Priority Data
Mar. 29, 2019 (DE) .................... 10 2019 204 418.2

(51) Int. Cl.
*B60R 11/04* (2006.01)
*B60R 1/26* (2022.01)
(Continued)

(52) U.S. Cl.
CPC ............. *B60R 11/04* (2013.01); *B60R 1/26* (2022.01); *G03B 17/561* (2013.01); *B60R 2001/1253* (2013.01)

(58) Field of Classification Search
None
See application file for complete search history.

(56) References Cited

U.S. PATENT DOCUMENTS

| 4,712,814 A | 12/1987 | Petterson |
| 8,896,698 B2 * | 11/2014 | Brester .............. B60R 11/04 |
| | | 348/148 |

(Continued)

FOREIGN PATENT DOCUMENTS

| DE | 102012201905 A1 | 8/2013 |
| DE | 102012015395 B3 | 11/2013 |

(Continued)

OTHER PUBLICATIONS

Notice of Reasons for Refusal dated Aug. 9, 2022 from corresponding Japanese patent application No. 2021-553867.
(Continued)

*Primary Examiner* — Rodney E Fuller

(57) ABSTRACT

A camera arm device for a mirror replacement system for a motor vehicle having a boom element, which has at least one camera (30) of the mirror replacement system is provided. A. housing, which cooperates with an end portion of the boom element in order to hold the boom element. There is arranged in the housing a guide groove through which the boom element extends and along which the boom element is movably mounted.

8 Claims, 4 Drawing Sheets

(51) Int. Cl.
*G03B 17/56* (2021.01)
*B60R 1/12* (2006.01)

(56) References Cited

U.S. PATENT DOCUMENTS

| | | | |
|---|---|---|---|
| 10,682,965 B2* | 6/2020 | Oba | B60R 11/04 |
| 2009/0231430 A1* | 9/2009 | Buschmann | B60Q 1/0023 |
| | | | 348/148 |
| 2014/0063233 A1 | 3/2014 | Henion et al. | |
| 2014/0063245 A1 | 3/2014 | Bowers et al. | |
| 2017/0001578 A1* | 1/2017 | Buschmann | H04N 23/55 |
| 2017/0280111 A1* | 9/2017 | Henion | B60R 11/04 |
| 2018/0265015 A1 | 9/2018 | Rohrmuller | |
| 2018/0272976 A1 | 9/2018 | Root et al. | |
| 2019/0176704 A1* | 6/2019 | Wezel | B60R 1/12 |
| 2020/0317142 A1 | 10/2020 | Miethig | |
| 2021/0206240 A1* | 7/2021 | Berne | B60J 3/002 |
| 2023/0211740 A1* | 7/2023 | LaCross | B60R 1/12 |
| | | | 348/148 |

FOREIGN PATENT DOCUMENTS

| | | |
|---|---|---|
| DE | 102014006961 A1 | 11/2015 |
| DE | 102017001122 B3 | 2/2018 |
| DE | 102018205848 B3 | 2/2019 |
| JP | S4716509 Y1 | 6/1972 |
| JP | S61502272 A | 10/1986 |
| JP | S63168226 U | 11/1988 |
| JP | H0288855 U | 7/1990 |

OTHER PUBLICATIONS

Office Action dated Jan. 10, 2020 from corresponding German Patent Application No. DE 10 2019 204 418.2.
International Search Report and Written Opinion dated Apr. 20, 2020 from corresponding International Patent Application No. PCT/EP2020/057468.
1 Japanese Decision to Grant dated Jun. 13, 2023 for the Japanese Patent Application No. 2021-553867.
Notice of Allowance dated Jun. 13, 2023 from corresponding Japanese patent application No. 2021-553867.

* cited by examiner

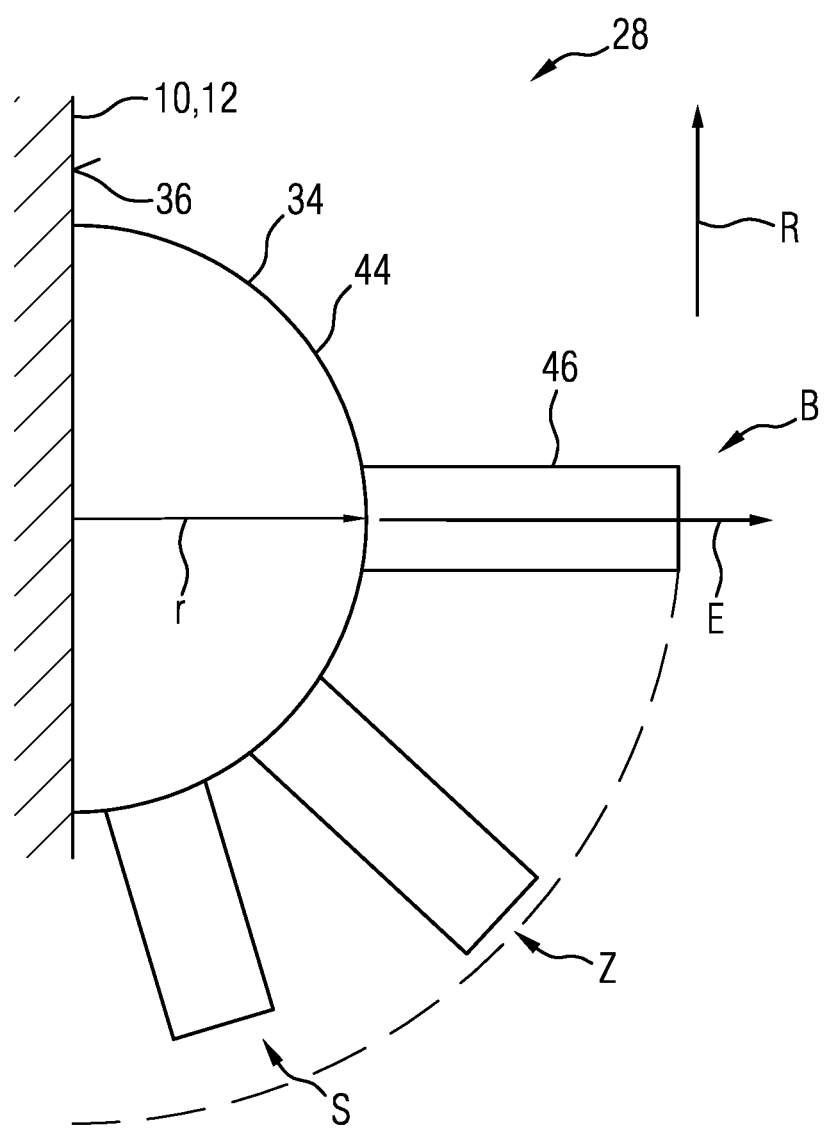

CAMERA ARM DEVICE FOR A MIRROR REPLACEMENT SYSTEM FOR A MOTOR VEHICLE AND MOTOR VEHICLE

CROSS REFERENCE TO RELATED APPLICATIONS

This U.S. patent application claims the benefit of PCT patent application No. PCT/EP2020/057468, filed Mar. 18, 2020, which claims the benefit of German patent application No. 10 2019 204 418.2, filed Mar. 29, 2019, both of which are hereby incorporated by reference.

TECHNICAL FILED

The invention relates to a camera arm device for a mirror replacement system of a motor vehicle, and to a motor vehicle which has such a camera arm device in a mirror replacement system.

BACKGROUND

In the case of motor vehicles there are statutory provisions according to which a driver of the motor vehicle must at all times be able to see fields of vision that he cannot view directly with his eyes because they lie within an indirect region. For this purpose, motor vehicles conventionally have rear-view mirrors in order, for example, to ensure rear visibility.

Such rear-view mirrors are mounted inter alia also in the exterior region of the motor vehicle and have, for example in the case of commercial vehicles, relatively large dimensions. This results in considerable wind resistance, which adversely affects the fuel consumption of the motor vehicle. The rear visibility can additionally be impaired by external influences such as rain and dirt on side windows of the motor vehicle and on the rear-view mirrors. In addition, the conventional mirror principle is not suitable for performing intelligent functions.

Therefore, mirror devices on motor vehicles, such as, for example, the rear-view mirrors, are increasingly being replaced by or supplemented with camera monitor systems as mirror replacement systems, wherein a camera mounted externally on the motor vehicle records an image of an area surrounding the motor vehicle and displays the image on a monitor, which can be mounted, for example, in the interior of the motor vehicle, in such a manner that it can be seen by the driver.

In order thus to replace conventional rear-view mirrors by digital mirror replacement systems, it is necessary to mount cameras externally on the motor vehicle, which cameras must be secured, for example, to a vehicle cab of a commercial vehicle. Since the cameras are secured to the motor vehicle externally, there is the constant risk of collision with obstacles in the surroundings or with other traffic participants.

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

A camera arm device for a mirror replacement system of a motor vehicle able to evade diverse force effects from outside is provided.

A camera arm device for a mirror replacement system of a motor vehicle, which may be a commercial vehicle, has a boom element, which has at least one camera of the mirror replacement system, and a housing, which cooperates with an end portion of the boom element in order to hold the boom element. There is arranged in the housing a guide groove through which the boom element extends and along which the boom element is movably mounted.

It is thus possible to secure the boom element to the vehicle by means of the housing but nevertheless ensure that the boom element is able to move along the housing. If the boom element strikes an obstacle, it is able to move along the guide groove over the housing and thus evade the obstacle.

In one configuration, the housing is designed to be hemispherical and hollow.

Furthermore, the guide groove may be designed as a slot which extends over a housing surface substantially perpendicularly to a direction of extension of the boom element.

Thus, when the commercial vehicle or motor vehicle strikes an obstacle with the boom element, the boom element is guided along the guide groove over the hemispherical housing and thus positioned against the motor vehicle. If the housing is hollow, the boom element can be inserted into the housing from the rear or from inside and then extend out of the housing away from the motor vehicle, in order to perform its function as a camera mount.

In another configuration, the guide groove has a concave curvature. Alternatively, it is, however, also possible that the guide groove is convexly curved. Further geometries of the guide groove are conceivable, so that diverse evasion geometries are thereby created for the boom element, for example in the horizontal and vertical direction simultaneously. Depending on the form of the guide groove, the boom element can follow different, for example cycloidal, trajectories, whereby different evading maneuvers are conceivable.

Particularly preferably, the camera arm device has a positioning device for holding the boom element in an operating position. A reliably predefined position, in which the camera records images of the surroundings, is thus ensured.

For example, a spring for positioning the boom element along its direction of extension and a locking device for positioning the boom element perpendicularly to its direction of extension can be provided.

In the operating position, the boom element extends substantially perpendicularly away from a surface of the commercial vehicle. In order to achieve a sufficient distance here, or in order to stabilize the operating position, a spring is provided, which spring builds up a pressure on the boom element and thus pushes it against the housing from inside. The boom element is thereby fixed in the radial direction, that is to say in the direction away from the motor vehicle and from the housing. Perpendicularly to the direction of extension of the boom element, that is to say substantially along the guide groove, there may be provided a locking device in order thus to prevent undesirable movement of the boom element along the guide groove. The locking device is overcome and the boom element moves over the surface of the housing, guided via the guide groove, only when a sufficient force is exerted on the boom element by a colliding obstacle. The locking device can thus stabilize a defined operating position.

There may be provided a fall-out prevention device which is arranged at the end portion of the boom element and has a circumference which is greater than a groove width of the guide groove. If the boom element is inserted into the housing from the rear and then pushed against the housing, for example, by the spring, it cannot fall out of the guide groove since the circumference of the fall-out prevention device is greater than the guide groove and falling out is thus mechanically prevented.

The fall-out prevention device may be designed to be spherical, with a sphere radius which corresponds substantially to a sphere radius of the hemispherical housing. The fall-out prevention device can thus conform closely to the housing from the inside and also does not impede a movement of the boom element in the event of a collision.

The system which ensures protection against mechanical effects on the boom element from diverse directions thus consists substantially of a housing, which forms a shell, and one or more spring elements, and also the boom element, which in most cases is designed to be rod-like and to which the camera and any further sensors are secured. The boom element can be inserted from the rear against the inner side of the housing, or shell, and held in position by means of the spring force of the spring. The reliable operating position is ensured via the locking device. In the event of a collision, the boom element is positioned against the geometry of the motor vehicle along the guide groove in the housing. As a result, in a dangerous situation due to mechanical stresses, the boom element is moved out of the operating position into a protected position, in order to avoid damage to the camera and further elements which are arranged on the boom element.

A motor vehicle, for example, a commercial vehicle has as a mirror replacement system a camera monitor system which has at least one camera which is secured to the motor vehicle by means of a camera device described above.

Other objects, features and characteristics of the present invention, as well as the methods of operation and the functions of the related elements of the structure, the combination of parts and economics of manufacture will become more apparent upon consideration of the following detailed description and appended claims with reference to the accompanying drawings, all of which form a part of this specification. It should be understood that the detailed description and specific examples, while indicating the preferred embodiment of the disclosure, are intended for purposes of illustration only and are not intended to limit the scope of the disclosure.

BRIEF DESCRIPTION OF THE DRAWINGS

The present disclosure will become more fully understood from the detailed description and the accompanying drawings, wherein:

FIG. 6 is a cross-sectional view, oriented perpendicularly to the views in FIG. 3 and FIG. 5, of the camera arm device from FIG. 1 in different positions.

DETAILED DESCRIPTION

Figure 1:
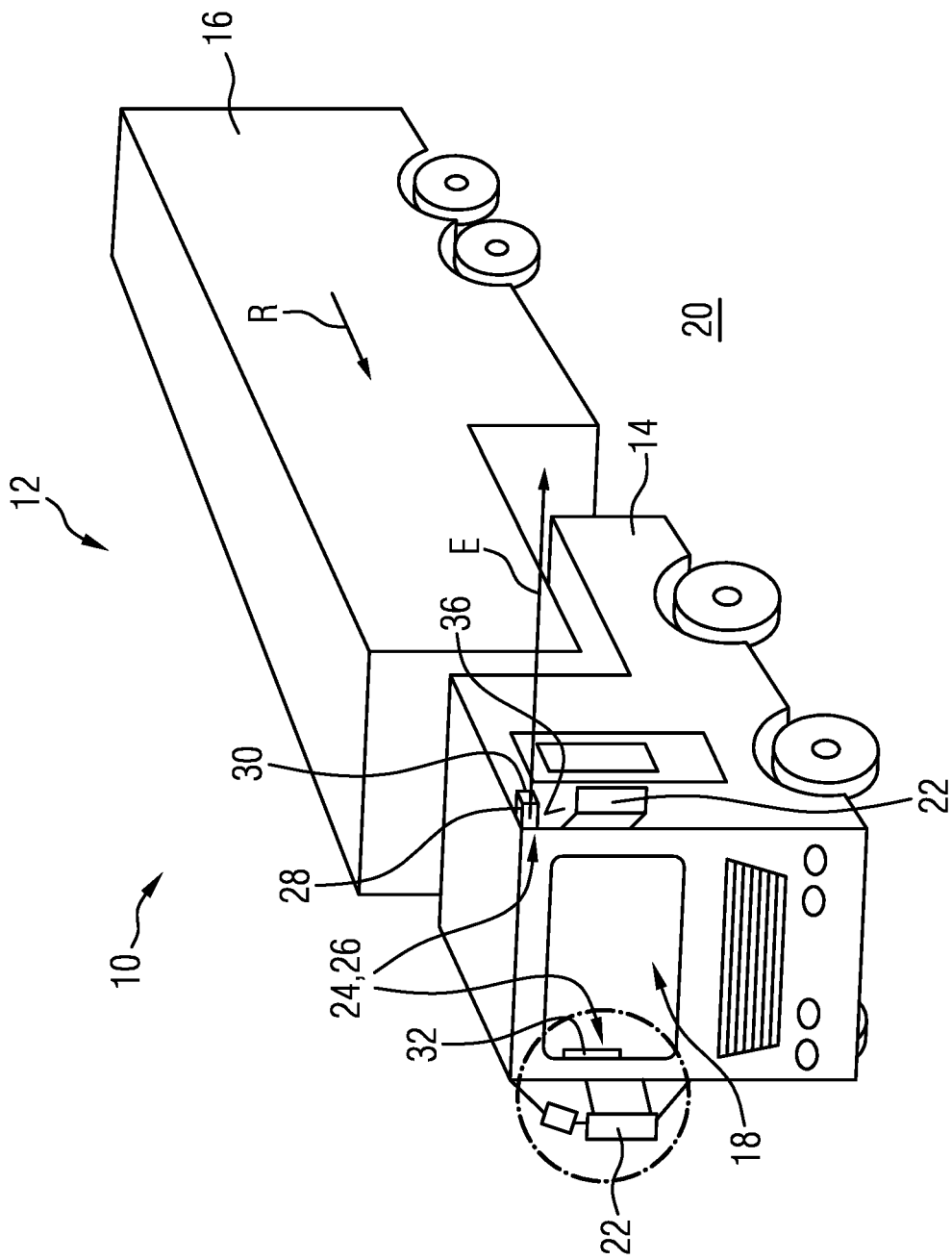
FIG. 1 shows a perspective illustration of a motor vehicle having a camera monitor system which has a camera arm device with a camera secured thereto.

FIG. 1 shows a perspective illustration of a motor vehicle 10, namely a commercial vehicle 12 in the form of a truck, which has a tractor unit 14 and a trailer 16. In the tractor unit 14 there is arranged a driver's cab 18 in which the driver is normally situated during operation of the motor vehicle 10, wherein the driver is to be able to see as much of the surrounding area 20 as possible during operation of the motor vehicle 10. In particular, he must be able to see fields of vision which are required by law.

In order to make this possible, on the one hand external mirrors 22 are arranged on the tractor unit 14, by means of which external mirrors the driver is able to see the surrounding area 20 to the rear, that is to say in the direction towards the trailer 16. In addition, the motor vehicle 10 has a camera monitor system 24, which is designed as a mirror replacement system 26 and thus can replace legally required mirrors on the tractor unit 14.

For this purpose, the mirror replacement system 26 has a camera arm device 28 which is mounted on the tractor unit 14 outside the driver's cab 18 and which has a camera 30 which records images of the surrounding area 20 of the motor vehicle 10 and forwards them to a monitor 32 which is arranged in the interior of the driver's cab 18 in such a manner that a driver who is in the driver's cab 18 is able to see the images of the camera 30 directly.

The camera 30 is accordingly secured to the driver's cab 18 via the camera arm device 28, wherein the camera arm device 28 on the one hand is to perform the function of holding and positioning the camera 30 and additional sensors, and on the other hand includes a function of protecting those elements against external environmental influences such as, for example, collisions.

One of these protective functions concerns protection against mechanical influences such as forces from a horizontal direction from the front and from the rear and further mechanical impact and shock stresses from all horizontal directions, that is to say from the front, from the rear and from the side.

Figure 2:
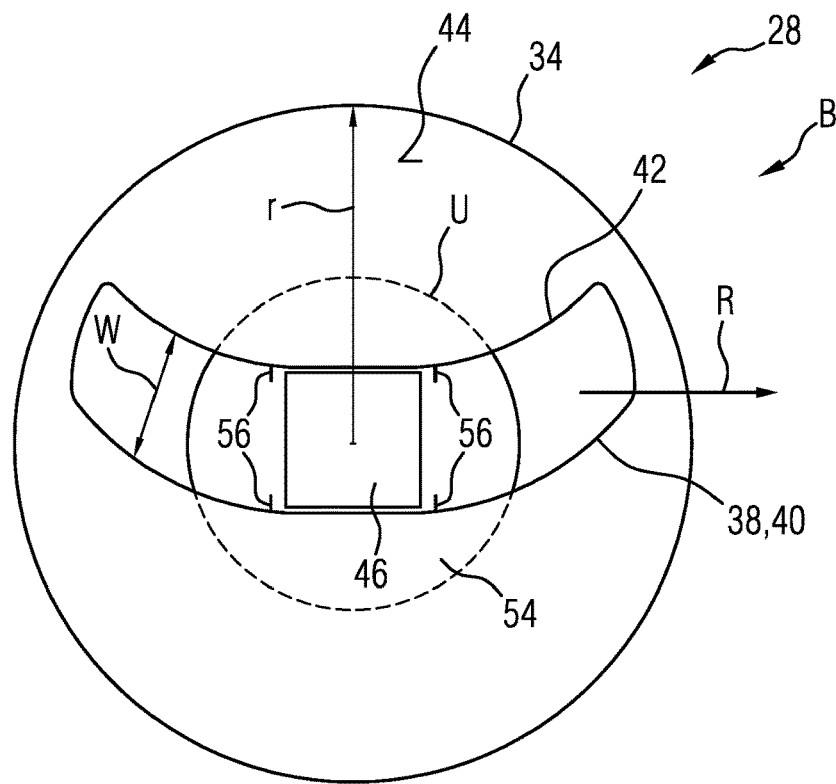
FIG. 2 is a plan view of the camera arm device from FIG. 1 in an enlarged illustration and in an operating position.
Figure 3:
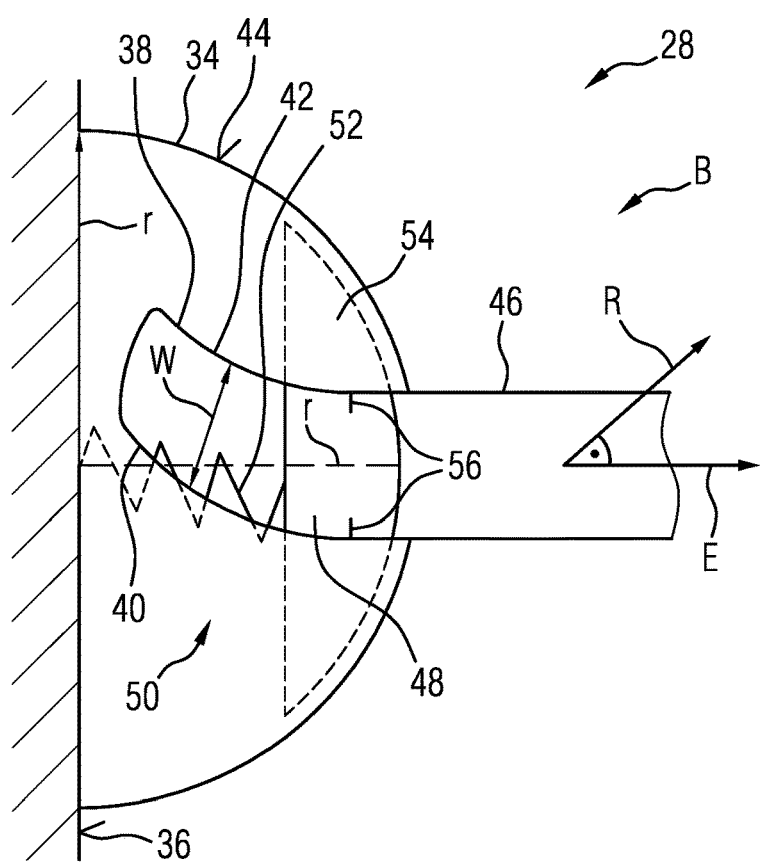
FIG. 3 is a cross-sectional view of the camera arm device from FIG. 2.

FIG. 2 is a plan view of the camera arm device from FIG. 1 in an enlarged illustration and in an operating position B. FIG. 3 is a cross-sectional view of the camera arm device 28 from FIG. 2 in the same operating position B.

The camera arm device 28 has, as can be seen in FIG. 2 and FIG. 3, a housing 34 which is designed to be hemispherical and hollow, similarly to a shell, and is secured to an outside surface 36 of the motor vehicle 10. There is introduced into the housing 34 a guide groove 38 which is designed as a slot 40 and extends with a concave curvature 42 over a housing surface 44 of the housing 34. In the present embodiment, the curvature 42 of the guide groove 38 is designed to be concave, but it is also possible to provide other geometries for the guide groove 38.

In addition to the housing 34, the camera arm device 28 further has a boom element 46 which in the operating position B extends away from the outside surface 36 of the motor vehicle 10. The camera 30, which in the operating position B is able to capture the surrounding area 20 of the motor vehicle 10 in order to display it on the monitor 32, is arranged on the boom element 46.

In the operating position B, the boom element 46 is arranged substantially perpendicularly to a direction of travel R of the motor vehicle 10. It extends away from the outside surface 36 of the motor vehicle 10 in a direction of extension E.

The boom element 46 is held by the housing 34, which cooperates with an end portion 48 of the boom element 46. The end portion 48 of the boom element 46 is thereby located inside the housing 34, while the remainder of the boom element 46 extends through the guide groove 38 out of the housing 34.

In order to hold the boom element 46 in its operating position B, a positioning device 50 is provided. The positioning device has a spring 52 which is fixed on one side to the outside surface 36 of the motor vehicle 10 and is secured on the opposite side to the end portion 48. The boom element 46 is thus pushed away from the outside surface 36 of the motor vehicle 10 by the spring force of the spring 52. Inside the housing 34 there is arranged on the boom element 46 a fall-out prevention device 54, the circumference U of which is greater than a groove width W of the guide groove 38. The spring 52 thus pushes the fall-out prevention device 54 against the housing 34 from the inside and holds the boom element 46 in the operating position B in the direction of extension E of the boom element 46.

If an obstacle appears in the direction of travel R of the motor vehicle 10 and collides with the boom element 46, the boom element 46 is able to evade the obstacle since it is movably mounted in the guide groove 38. That is to say, the boom element 46 is not fixed stationarily in the guide groove 38, or to the housing 34. If a collision occurs, the boom element 46 thus moves out of the operating position B and thus prevents excessive forces, which could damage the camera 30, from acting on the camera 30. The geometry of the guide groove thereby defines the evasion geometry. In the embodiment shown in FIG. 2 and FIG. 3, the boom element 46 is able to evade upwards and to the rear until it reaches a protected position S shown in FIG. 4 and FIG. 5. In this protected position S, the boom element 46 is positioned against the motor vehicle 10 and is protected from mechanical effects.

In order to hold the boom element 46 securely in the operating position B also in the case of lesser forces in the direction of travel R that act during normal operation of the motor vehicle 10, a locking device 56 is provided, into which locking device the boom element 46 engages perpendicularly to its direction of extension E.

The boom element 46 moves along the guide groove 38, that is to say substantially perpendicularly to a direction of extension E, into the protected position S only when, as a result of a collision, the forces on the boom element 46 overcome the holding force of the locking device 56.

In order that this movement into the protected position S is not impeded, the fall-out prevention device 54 is advantageously likewise designed to be hemispherical and has a sphere radius r which corresponds substantially to a sphere radius r of the hemispherical housing 34. The fall-out prevention device 54 is thus able to conform well to the housing 34 from the inside and also slide along the inner surface of the housing 34 when the boom element 46 moves.

Figure 4:
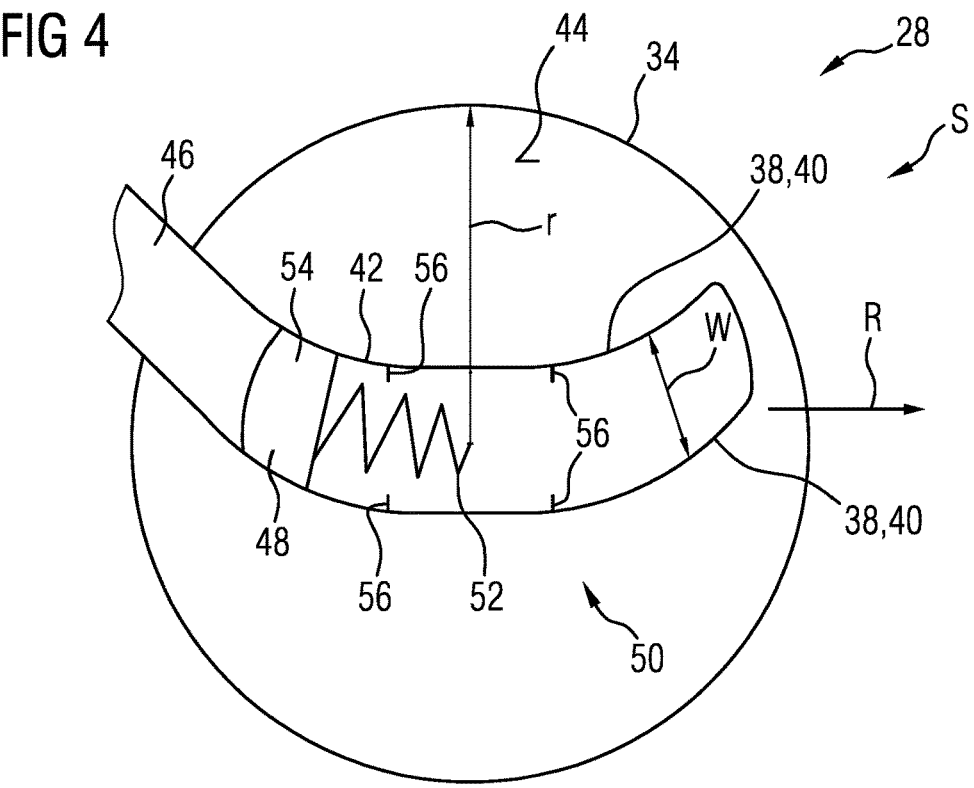
FIG. 4 is a plan view of the camera arm device from FIG. 1 in an enlarged illustration and in a protected position.
Figure 5:
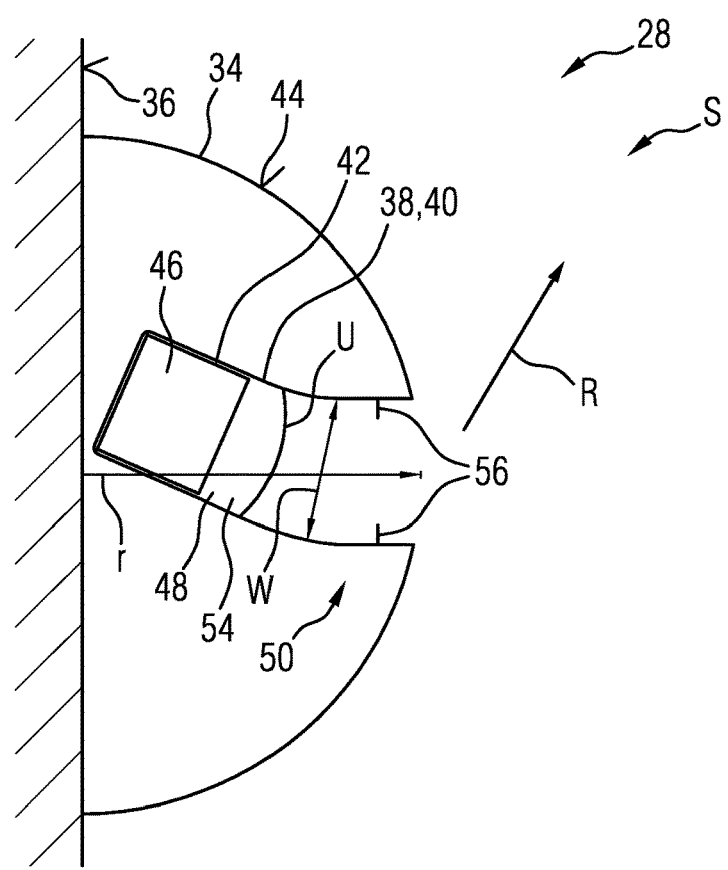
FIG. 5 is a cross-sectional view of the camera arm device from FIG. 4.

As already mentioned above, FIG. 2 and FIG. 3 are different views of the boom element 46 in the operating position B, while FIG. 4 and FIG. 5 are different views of the boom element 46 in the protected position S.

In FIG. 6 there is additionally shown a sectional view which is rotated through 90° relative to the views in FIG. 5 and FIG. 3, wherein the boom element 46 is shown in different positions, namely the operating position B, the protected position S and an intermediate position Z.

The foregoing preferred embodiments have been shown and described for the purposes of illustrating the structural and functional principles of the present invention, as well as illustrating the methods of employing the preferred embodiments and are subject to change without departing from such principles. Therefore, this invention includes all modifications encompassed within the scope of the following claims.

The invention claimed is:

1. A camera arm device for a mirror replacement system of a motor vehicle comprising:
    a housing, wherein the housing comprises:
        a housing surface defining a hollow space within the housing; and
        a guide groove configured to form a slot in the housing, wherein the guide groove is configured to have a curvature along the housing surface and wherein the curvature extends in a first direction towards a rear of the housing and a second direction upward towards a top of the housing or downward towards a bottom of the housing; and
    a boom, the boom comprising:
        a first end portion disposed within the housing, the first end portion connecting the boom to the housing; and
        a second end portion extending through the guide groove outside the housing.

2. The camera arm device as claimed in claim 1, wherein the housing is hemispherical and hollow.

3. The camera arm device as claimed in claim 1, wherein the guide groove extends over the housing surface perpendicularly to a direction of extension of the boom.

4. The camera arm device as claimed in claim 1, wherein the curvature is a concave curvature.

5. The camera arm device as claimed in claim 1, wherein the housing further comprises a positioning device for holding the boom in an operating position.

6. The camera arm device as claimed in claim 5, wherein the housing further comprises:
    a spring for positioning the boom along a direction of extension; and
    a locking device for positioning the boom perpendicularly to the direction of extension.

7. The camera arm device as claimed in claim 1, wherein the housing further comprises a fall-out prevention device arranged along the boom element having a circumference greater than a groove width of the guide groove.

8. The camera arm device as claimed in claim 7, wherein the fall-out prevention device is hemispherical with a sphere radius which corresponds substantially to a sphere radius of the housing.

* * * * *